United States Patent
Sadr

(10) Patent No.: US 7,105,121 B2
(45) Date of Patent: Sep. 12, 2006

(54) SEALING BEAD

(75) Inventor: Changize Sadr, North York (CA)

(73) Assignee: Salflex Polymers Ltd., Weston (CA)

( * ) Notice: Subject to any disclaimer, the term of this patent is extended or adjusted under 35 U.S.C. 154(b) by 261 days.

(21) Appl. No.: 10/874,234

(22) Filed: Jun. 24, 2004

(65) Prior Publication Data

US 2004/0227273 A1 Nov. 18, 2004

Related U.S. Application Data

(62) Division of application No. 10/274,453, filed on Oct. 21, 2002, now Pat. No. 6,811,739, which is a division of application No. 09/512,366, filed on Feb. 25, 2000, now Pat. No. 6,467,643.

(51) Int. Cl.
*B29C 47/02* (2006.01)

(52) U.S. Cl. ...................... 264/266; 264/296

(58) Field of Classification Search ................ 264/266, 264/296
See application file for complete search history.

(56) References Cited

U.S. PATENT DOCUMENTS

| | | | |
|---|---|---|---|
| 3,779,420 A | 12/1973 | Knaus | |
| 3,801,402 A | 4/1974 | Suter | |
| 3,801,425 A | 4/1974 | Cook | |
| 4,368,086 A | 1/1983 | Villemain | |
| 4,995,528 A | 2/1991 | Sharp | |
| 5,129,544 A | 7/1992 | Jacobson et al. | |
| 5,425,470 A | 6/1995 | Duhaime et al. | |
| 5,547,096 A | 8/1996 | Kleyn | |

FOREIGN PATENT DOCUMENTS

| | | |
|---|---|---|
| EP | 0 300 192 | 6/1988 |
| JP | 58175636 | 10/1983 |
| JP | 58202112 | 11/1983 |
| WO | WO 00/29773 | 5/2000 |
| WO | WO 00/43230 | 7/2000 |

OTHER PUBLICATIONS

Ten Page Brochure Entitled 'Adhesive Resiin Admer' Mitsu Petrochemicals (America).

*Primary Examiner*—Suzanne E. McDowell
(74) *Attorney, Agent, or Firm*—Bereskin & Parr

(57) ABSTRACT

Fuel system components for vehicles may be made from polyethylene components which are typically blow molded. To inhibit fuel vapour permeation, the polyethylene is often co-extruded into a parison with the parison comprising a barrier layer. Upon trimming flash or in the mold closure itself, the barrier layer may be ruptured. Sealing of areas of discontinuity in the fuel system component to inhibit hydrocarbon vapour pass through is achieved by sealing the area of barrier discontinuity with a sealing bead which has the necessary barrier properties. The barrier properties may be inherent in the sealing bead material or in a barrier layer extruded into the sealing bead.

8 Claims, 4 Drawing Sheets

SEALING BEAD

This application is a divisional of U.S. application Ser. No. 10/274,453 filed Oct. 21, 2002 now U.S. Pat. No. 6,811,739, which is a divisional of U.S. application Ser. No. 09/512,366 filed Feb. 25, 2000, now U.S. Pat. No. 6,467,643 issued Oct. 22, 2002.

FIELD OF THE INVENTION

This invention relates to fuel system components and in particular to plastic structures such as fuel tanks and the like which may be made using blow molding techniques. In particular, the invention relates to a method and structure for sealing such blow molded fuel system components to further inhibit hydrocarbon vapour permeation through the finished structure.

BACKGROUND OF THE INVENTION

Hydrocarbon containing fuels such as gasoline are the most common power source for internal combustion engines. Gasoline must be carried by the vehicle, usually in a fuel tank. Heretofore fuel tanks have been manufactured from metal. More recently however, much work has been done on fuel tanks made from plastic resins, typically polyethylene. Polyethylene is a very suitable material for making fuel system components such as tanks in that it is readily moldable using blow molding techniques. However, it has been determined that fuel vapour can permeate through the wall of a fuel system component such as a fuel tank when the wall is manufactured solely from polyethylene. In order to provide suitable anti permeation characteristics, more complex wall structures for such fuel system components have been developed. In our co-pending patent application Ser. No. 09/192,295 filed Nov. 17, 1998, the disclosure which is herein incorporated by reference, there is a discussion of a multi-layer conduit. Such conduits are readily manufacturable using blow molding techniques.

In the blow molding technique, a parison is extruded from an extrusion head. The parison is normally allowed to hang vertically from the extrusion head as the correct amount of parison to make the desired part is extruded. The parison is placed between the open portions of a blow molding mold. The blow molding mold is then closed around the parison and the parison is pinched off at the top and bottom. A convenient structure, typically a blow molding needle, pierces the wall of the parison and blowing gas under pressure is introduced into the interior of the parison. The parison which at that stage is hot and still quite flowable is expanded outwardly by the blowing gas and the shape of the cavity in the blow mold determines the exterior configuration of the blow molded part. The blow molded part then has a wall thickness which is substantially uniform around the dimension of the part, subject only to certain thinning of the parison as it is stretched to meet the configuration of the mold cavity.

Plastic molded fuel tanks have now proven to be commercially acceptable on incorporation of some means to control permeation. Typically, the permeation can be controlled by barrier layers such as a layer of ethylene vinyl alcohol copolymer (EVOH) which is incorporated into a multi-layer parison and wall structure. Typically, in order to adhere the EVOH layer, adhesive is supplied to either side of the EVOH barrier layer as the barrier layer is extruded from the extrusion head. Typically, the adhesive attaches the EVOH layer to an outer layer of polyethylene and an inner layer of polyethylene. Either or both of the polyethylene layers may include either virgin material or scrap reground polyethylene material. Where required by the conditions, the inner layer of the fuel system component may also be modified so as to conduct electricity. This helps provide an electrical path to bleed off static electricity which might be generated in or around the fuel stored in the fuel system component. All of the various layers are simultaneously extruded through a multi channel extrusion head to produce a parison ready for molding.

While tanks of the type described generally above are proving quite satisfactory, there is a continuing need to further reduce the possibility of permeation of fuel vapours from fuel system components, in particular gasoline tanks. It has been discovered that the pinch off area which occurs in the molding operation may be a source of fuel permeation. This occurs because of breach or exposure of the barrier layer in the pinching process or in the subsequent process of flash removal.

Another area of fuel vapour permeation is through other fuel system components which may be attached to a tank such as flanges, pipe nipples, sender units flanges, fuel pump flanges and the like. When a flange is made from polyethylene or other material that is thermally fusible to the tank or fuel system component, that flange itself may provide a discontinuity in the barrier quality of the tank and then present a path for fuel vapour permeation.

Accordingly, there is a need to have a further improved fuel system component in which the component is better sealed to further inhibit fuel vapour permeation.

SUMMARY OF THE INVENTION

In accordance with one aspect of this invention, a fuel system component for a vehicle comprises a wall structure wherein at least one portion of the wall structure includes a barrier layer for inhibiting permeation of fuel vapours through the wall structure of the fuel system component. The fuel system component has at least one area of barrier discontinuity. The fuel system component includes a bead which comprises material for inhibiting permeation of hydrocarbon vapours and the bead overlies the area of barrier discontinuity. The outer layer of the wall structure and at least a portion of the bead are comprised of complimentary heat fusible materials for sealing the bead to the wall structure over the area of barrier discontinuity.

In another aspect of the invention, a process for inhibiting fuel vapour permeation in a component for storing or conveying hydrocarbon fuels, where the component includes an area of barrier discontinuity includes the step of covering the area of barrier discontinuity of the component with a sealing bead. The sealing bead includes a barrier element for inhibiting fuel vapour permeation therethrough.

In a further aspect of the invention, the invention comprises a process for producing a fuel system component comprising the following steps, extruding a multi-layer parison from an extrusion head wherein the parison comprises a barrier layer for substantially inhibiting permeation of fuel vapours. The parison is enclosed in a partible blow mold. The parison is blow molded and cooled to produce a molded product. The molded product is removed from the mold. The finished molded product will have at least one area of barrier discontinuity. A bead of material is placed on the molded product at the area of barrier discontinuity. The material of the bead comprises a barrier property for substantially inhibiting permeation of fuel vapours through the bead.

BRIEF DESCRIPTION OF THE DRAWINGS

The invention will now be more clearly understood by reference to the following drawings, which illustrate a preferred embodiment of the invention, and in which.

DETAILED DESCRIPTION OF THE INVENTION

Figure 1:
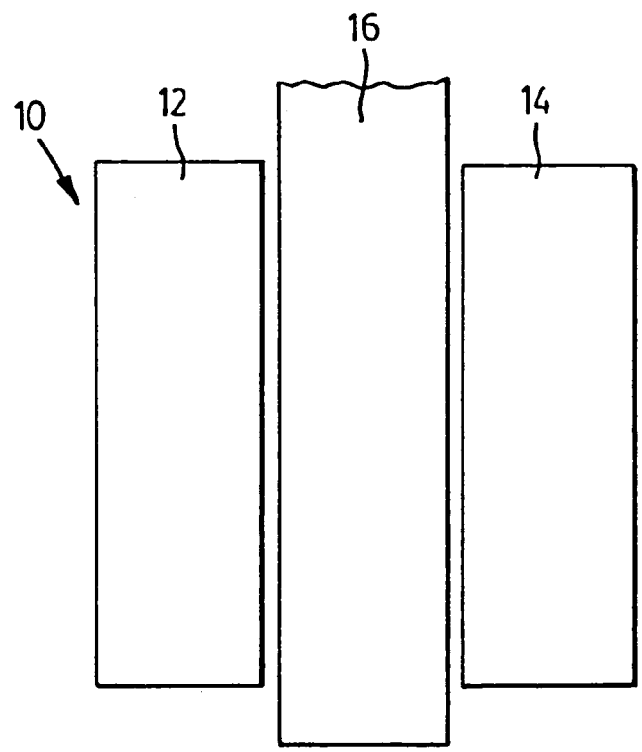
FIG. 1 illustrates a general arrangement of a parison and blow mold prior to mold closure.
Figure 2:
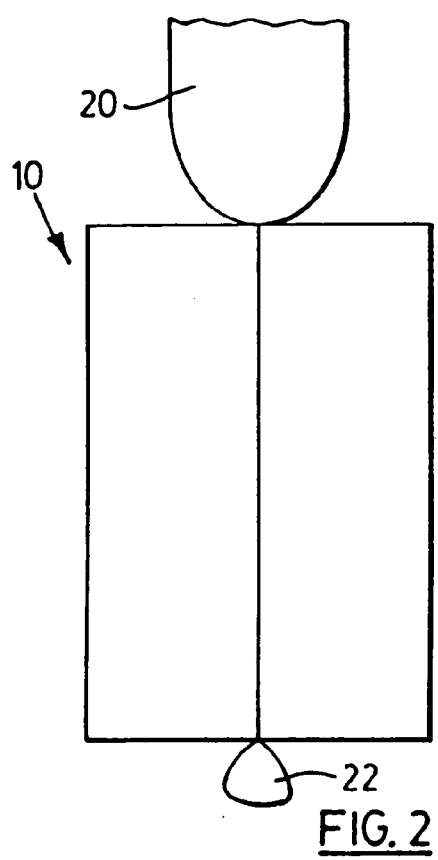
FIG. 2 illustrates a mold and parison of FIG. 1 after the mold has been closed.

FIG. 1 illustrates the general arrangements of components in typical blow molding procedure. A blow mold 10 comprises complimentary mold portions 12 and 14. The mold portions 12 and 14 are movable horizontally, as shown in FIG. 1, from an open position to a closed position as shown in FIG. 2. When the mold portions 12 and 14 are in the open position, a parison 16 is extruded from an extrusion head (not shown). The parison will hang substantially vertically from the extrusion head. When the parison has been extruded and has the appropriate length, the mold portions 12 and 14 are closed. The closed configuration is illustrated in FIG. 2.

With reference to FIG. 2, it will be noted that there is a small portion of the parison indicated diagrammatically above the mold 10 as 20. There will also be a small amount of parison material extending beyond the mold indicated generally at 22. In order to achieve typical blow molding, the parison must form an air tight enclosure. Thus, the mold portions 12 and 14 pinch the area tight. The area of pinch typically will occur substantially adjacent the upper and lower portions of the mold portions 12 and 14, but may occur elsewhere in the parison depending upon the shape of the parison and other moving components such as slides and the like which may be components of the mold portions 12 and 14. For purposes of simplicity and explaining this invention, it will be assumed that the only pinch of the parison 16 which occurs is substantially adjacent the upper and lower surfaces of the mold 16 as pictured in FIG. 2.

Figure 3:
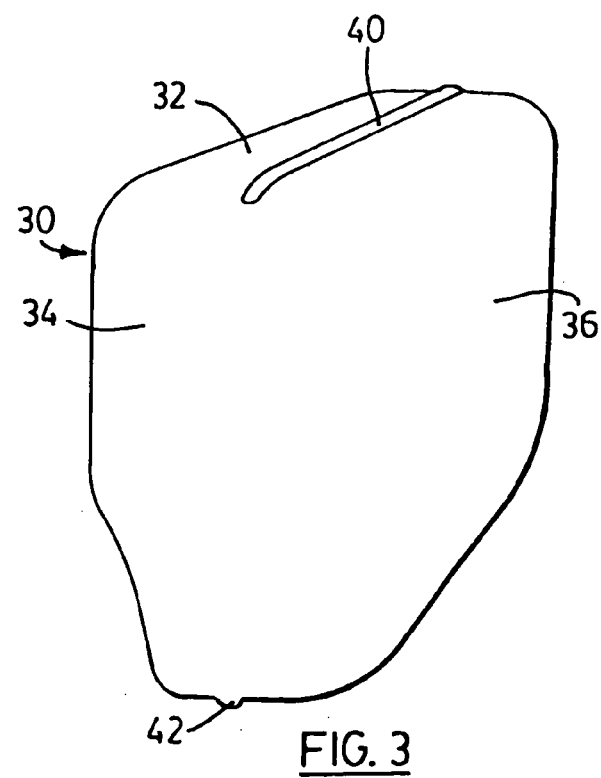
FIG. 3 illustrates diagrammatically a gasoline tank which may be produced in the mold of FIGS. 1 and 2.

Upon cooling of the parison material, the mold portions 12 and 14 are again moved to the open position as illustrated in FIG. 1 and the finished molded part is removed from the mold. FIG. 3 illustrates a fuel tank which may be produced according to the FIGS. 1 and 2. The fuel tank indicated generally at 30 has an upper surface 32, and side walls 34 and 36.

In the areas where the parison is pinched, there will be a ridge of material upstanding from the general plane of the surface 32. This ridge of material is identified as 40. The ridge of material 40 may extend substantially across the entire upper surface 32.

The fuel tank 30 will also have a lower surface generally opposite to the upper surface 32. While this surface is not visible in FIG. 3, the edge of that surface adjacent wall 32 is visible. There will also be a ridge of material pinched off as illustrated at 42. The ridge 42 will extend substantially along the bottom surface of the fuel tank 30.

The ridges 40 and 42 are substantially similar. They need not have the same configuration as the configuration will be determined by the mold characteristics and the location of the parting line between the mold halves. These need not be the same at the top and bottom of the fuel tank. Typically, although not necessarily, the ridges 40 and 42 are referred to as "flash" and are removed by cutting off excess material.

We have determined that the ridges 40 and 42 are sites for possible permeation losses of fuel vapour from the fuel tank 30. Permeation can occur through the walls of the fuel tank 30 if the fuel tank 30 is made simply of polyethylene. By using a multi-layer parison incorporating a barrier layer, the permeation losses from the fuel tank are very substantially inhibited as compared to a fuel tank manufactured from a material not having the appropriate barrier layer characteristic. However, the ridges 40 and 42 are problematic areas in the tank caused as it is produced in the mold 10 or during flash removal. This is because the parison material must flow in the area of the pinch and the barrier layer may be ruptured or exposed to air either during the pinching operation forming the ridge 40 and 42 or during the flash removable stage which is typically conducted on the part 30 after its removal from the mold 10.

If the barrier layer becomes discontinuous because of rupture or removal, then there is a narrow path for hydrocarbon vapours to pass along the polyethylene and out through the area where the barrier layer has been breached. Polyethylene will stop the passage of any liquid but will not sufficiently inhibit permeation of hydrocarbon vapours.

Even if the barrier layer is not itself breached, the continuity of the outer materials of the multi-layer fuel tank may be removed during the flash removal process to the point that the barrier layer is exposed to air. Once a barrier layer of material such as EVOH is exposed to ambient air, the barrier layer will absorb moisture from the air. Upon absorbing moisture from ambient air, the barrier qualities of the EVOH begin to deteriorate. Ultimately the barrier material will cease to have acceptable barrier properties and fuel vapour will be able to permeate through the polyethylene and the deteriorated barrier material. These areas in which the barrier layer has been breached or exposed are referred to herein as areas of barrier discontinuity.

Figure 4:
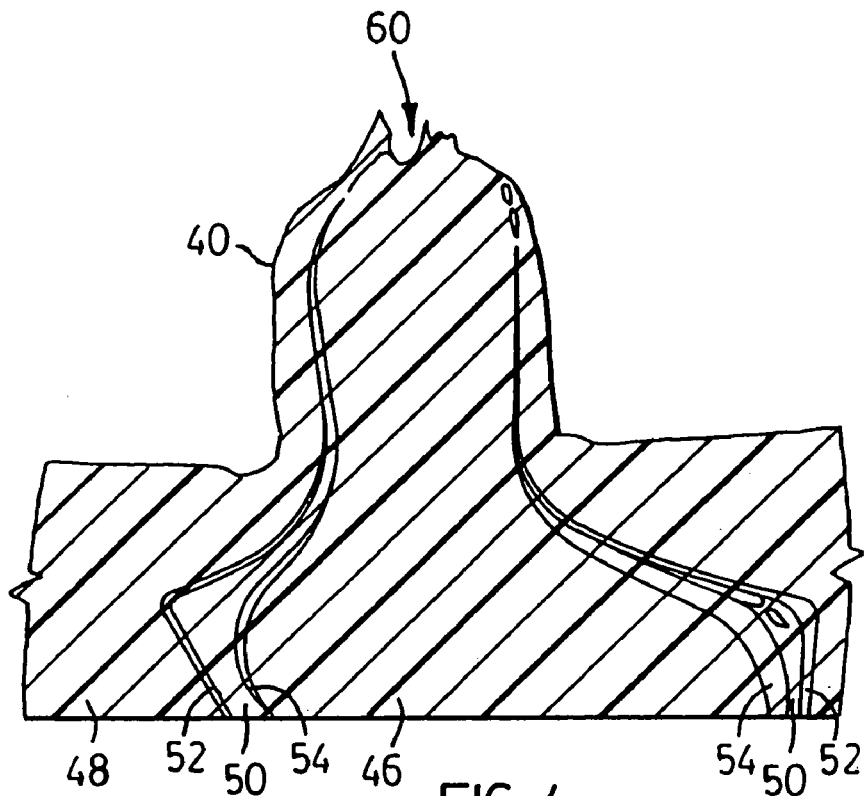
FIG. 4 is an enlarged view of the pinch off portion of the gasoline tank of FIG. 3 illustrating the multi-layer structure in the area of the pinch off.

FIG. 4 is a diagram showing an enlarged cross-sectional view through a ridge 40 after a fuel tank 30 is removed from a mold 10. In the diagram, the polyethylene inner and outer layers are identified as 46 and 48 respectively. The EVOH barrier layer is illustrated at 50, while the adhesive layers are shown at 52 and 54. Adjacent the apex 60 of the ridge 40, it will be observed that there is an area of barrier discontinuity. As shown in FIG. 4, the ridge 40 thus provides a permeation route which is not inhibited by a barrier, through the apex portion 60.

Figure 5:
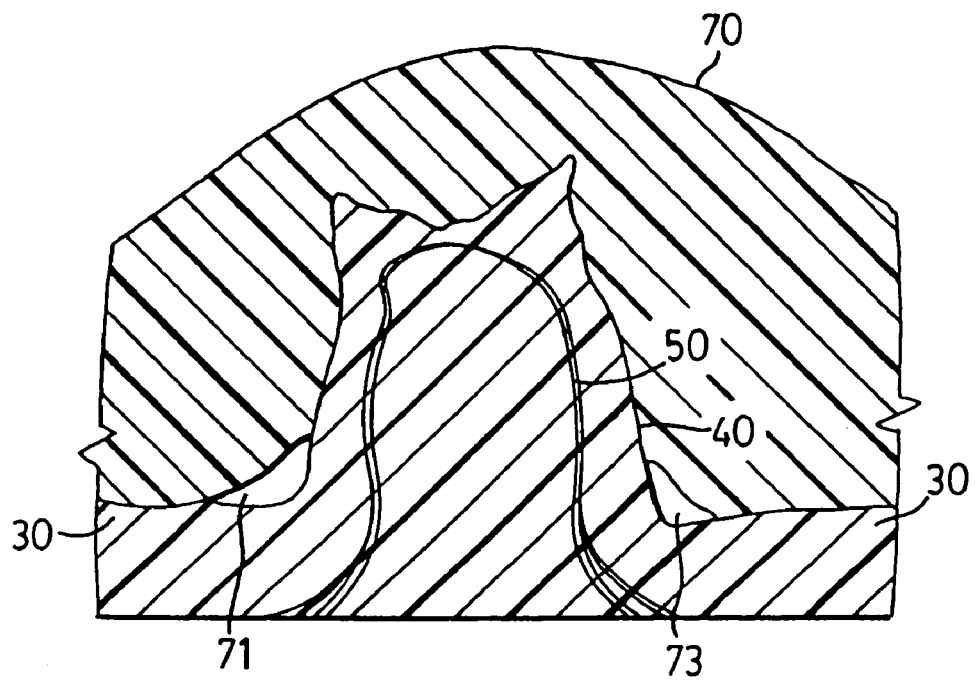
FIG. 5 is a view similar to FIG. 4 illustrating a cross-sectional area of the pinch off which has been sealed in accordance with the present invention.

FIG. 5 illustrates a means for sealing the ruptured ridge 40 adjacent the apex 60. In FIG. 5, there is illustrated a sealing 70 which overlies the ridge 40. The sealing 70 serves to seal the ridge 40. The purpose of the sealing 70 is that it replace the function of the ruptured barrier layer 50. In order to do this, the sealing 70 must itself provide suitable barrier quality. In addition, the sealing 70 is sealed to the fuel tank 30 on either side of the ruptured portion of the barrier 60. Small air voids shown at 71 and 73 may exist at either edge of the ridge 40. The bead overlies the area of barrier discontinuity and the bead is thermally fused to the tank wall 30 on either side of the ridge 40.

The sealing bead 70 may itself be a multi-layer extrusion. This is illustrated diagrammatically in FIG. 6. Similar to the material from which the fuel tank 30 is constructed, the sealing 70 may also have an inner layer of polyethylene material 72 which may be either virgin polyethylene, reground polyethylene or mixtures. This would then be followed by an inner adhesive layer 74, an EVOH or other barrier layer 76, an outer adhesive layer 78 and an outer layer 80 of polyethylene which, again, may be either virgin polyethylene, reground polyethylene or mixtures. The inner and/or outer layer 72 and 80 of polyethylene of the sealing 70 will then be heat sealable to the outer polyethylene layer of the tank 30 to comprise a seal.

Figure 7:
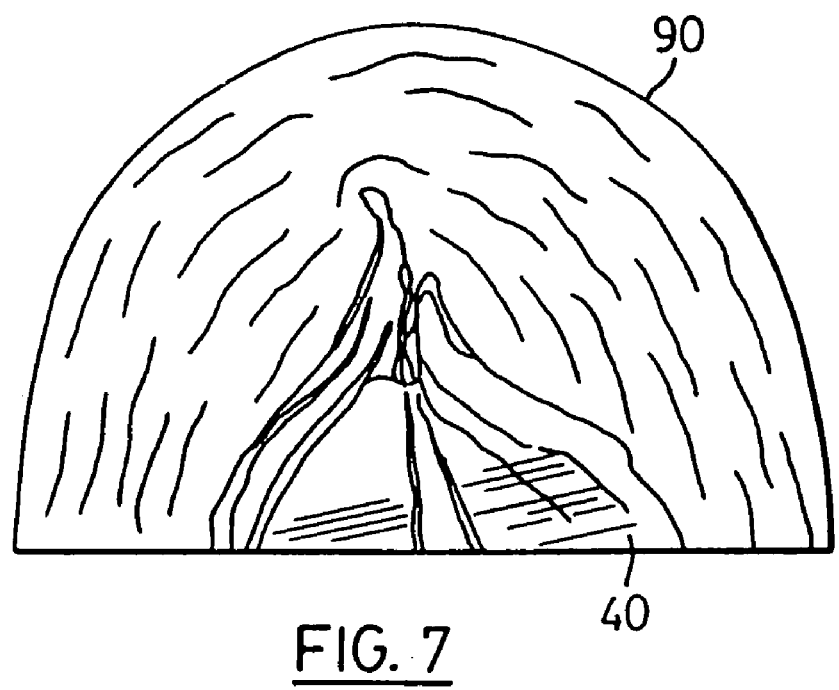
FIG. 7 is a view similar to FIG. 6 but showing an alternate embodiment of the invention.

An alternative material for the barrier 70 is illustrated in FIG. 7. The sealing bead 90 illustrated in FIG. 7 is comprised of material which is itself a barrier and thus does not need to be a multi-layer material. Materials such as the resin sold by the Dupont company under the trade mark SELAR RB is now sold as a barrier resin for plastic fuel tanks. The barrier resin sold by Dupont is said to be a pellet blend of a nylon copolymer and a proprietary adhesive for nylon and high density polyethylene. The SELAR material provides the required barrier performance to reduce evaporative emissions through the bead. In addition, the SELAR material is compatible for thermal welding to polyethylene.

Figure 8:
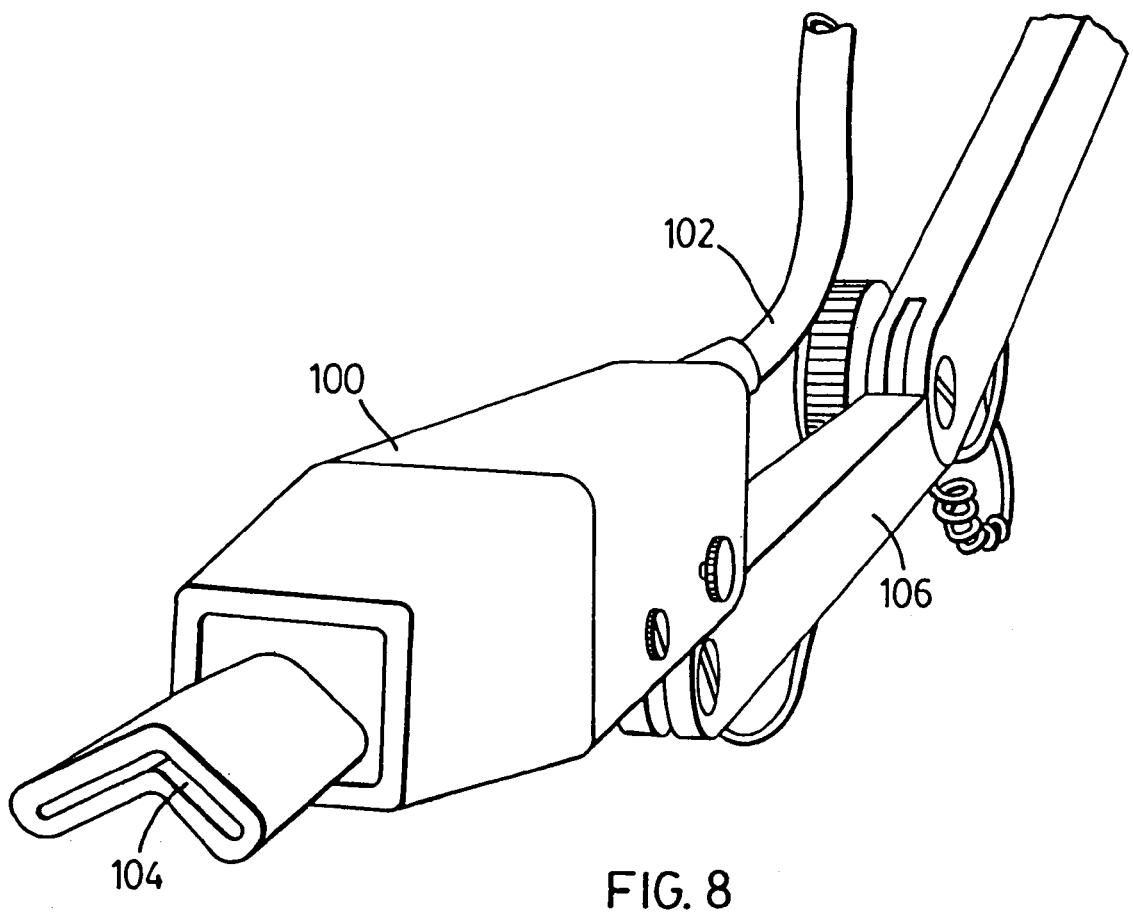
FIG. 8 is a perspective view of an apparatus for applying a sealing bead in accordance with the invention.

Most conveniently, the sealing bead may be applied to the ridges 40 and 42 after any flash is removed by means of an extrusion die 100 which may be connected to a flexible conduit 102 (see FIG. 8). The extrusion head 100 may extrude the sealing bead 70 or the sealing bead 90 through a substantially V-shaped slot 104 over the raised ridges 40 and 42. The extrusion head may be moved by a robot controlled arm 106 to lay a bead over the ridges 40 and 42 after the flash removal process has been completed.

Figure 6:
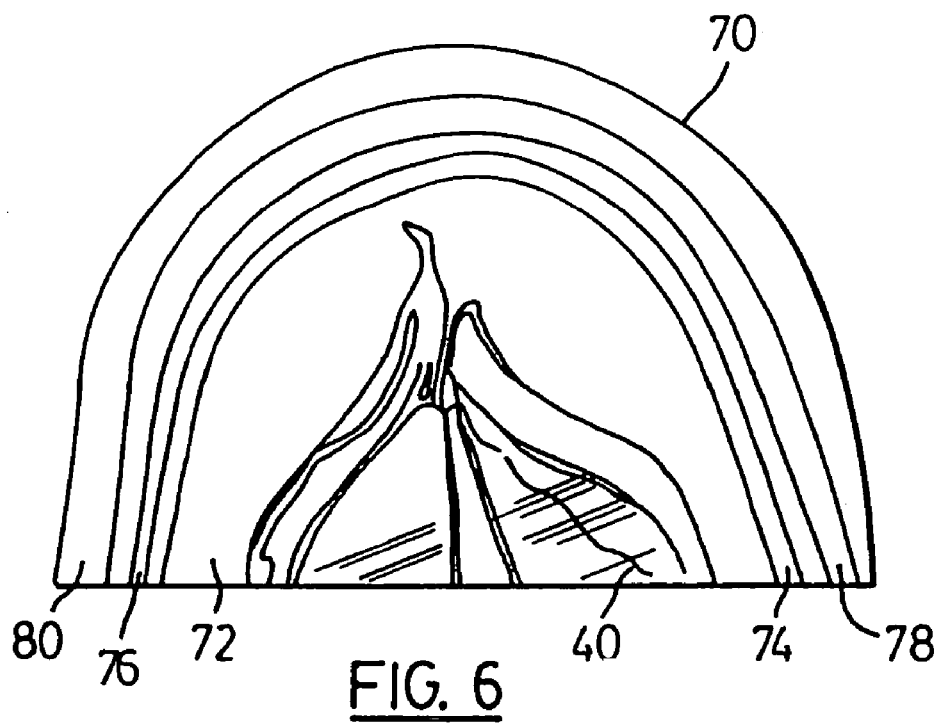
FIG. 6 is a view similar to FIG. 4 of the sealed portion of the pinch off of the gasoline tank in accordance with an embodiment of this invention.

If the sealing bead is in the form of an inherent barrier material such as SELAR then a single conduit carrying SELAR to the extrusion head may be used. If a multi-layer material is to be used such as shown in FIG. 6, then the head 100 must be equipped for multi-layer extrusion. The material for the head 100 may be supplied by a conduit or conduits 102 or the material may be preformed in a stick-like bar and fed to the slot 104 in a manner similar to a glue gun using glue sticks.

While the invention herein has been discussed in connection with a fuel tank 30 having a pinch off or bead formed at the upper and lower surfaces, the technology is applicable to any areas in which there has been a breach of the barrier property of a multi-layer structure. This may occur where the parison material is pinched by moving slides or other sub components of the mold portions or where the barrier layer is otherwise breached during flash removal operations and the like. Also an area of breach may occur when another fitting is attached to a component which has barrier qualities.

An example of this occurrence may be where a fuel tank is manufactured having the requisite barrier qualities. However, after manufacture, it may be that several holes are cut into the tank. Such holes may be for locating the fuel sender unit and for the location of pipe nipples, roll over valves and other similar fittings that are often associated with fuel system components, in particular, fuel tanks. Typically, when other such fittings are incorporated in a fuel tank, the necessary size of holes is cut or punched or otherwise formed in the tank. The fuel system fitting, for example, a pipe nipple, will then be welded to the tank. The pipe nipple for the tank may have a flange for welding to the tank. The pipe nipple may be made from material which has sufficient barrier qualities such as nylon, but the flange to be used to weld the pipe nipple to the tank must be thermally compatible for fusing to the tank material. In such cases, it is known to use a modified polyethylene that is weldable to standard polyethylene as well as to other polymeric materials such as nylon.

Figure 9:
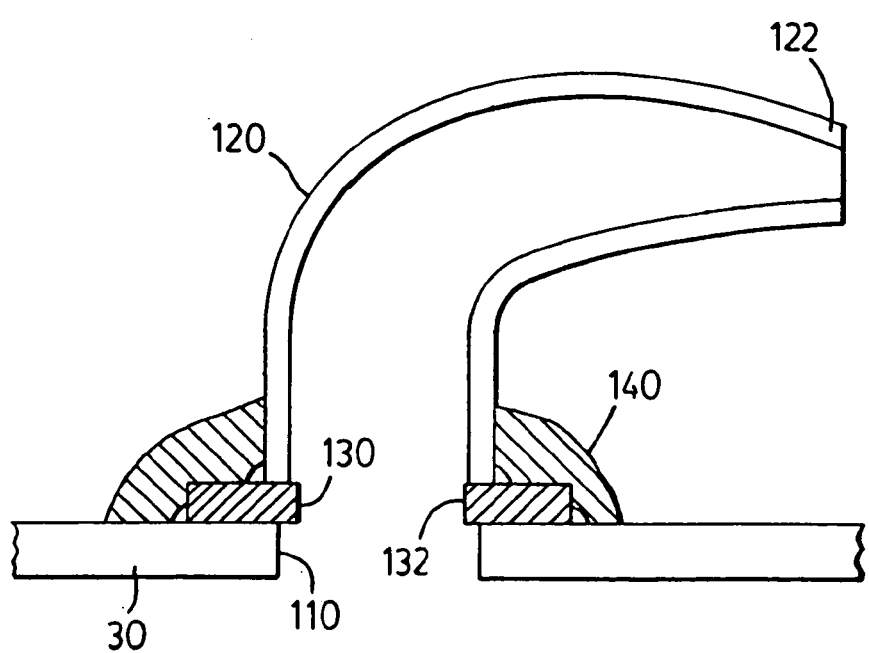
FIG. 9 is a cross-section of a further embodiment of the invention.

FIG. 9 illustrates diagrammatically in cross-section, the connection of a pipe nipple to a tank 30. A hole 110 has been formed in the wall of the tank for communication with a pipe nipple illustrated generally at 120. The pipe nipple 120 may be advantageously formed from nylon or other material which is creep resistant so that a flexible conduit may be tightly clamped to the end portion 122 of the pipe nipple 120. The tank 30 illustrated in FIG. 9 may be formed from a multi-layer extrusion as discussed previously. Thus, the tank 30 comprises a barrier layer not shown in FIG. 9, which will inhibit the passage of hydrocarbon vapours through the wall of the tank 30. The tank 30 may have an outer layer which is comprised of polyethylene material. In order to join the nylon pipe nipple 120 to the tank 30, a washer-shaped flange element 130 is formed. The flange element 130 has a central aperture 132 which may be the same size and configuration as the hole 110 or different as required by the configuration of the pipe nipple 120. Preferably the flange element 130 is formed of a modified polyethylene material. The modified polyethylene material may be welded both to the nylon of the pipe nipple 120 and to the outer surface of the multi-layer tank 30.

In the configuration as shown in FIG. 9, fuel vapours can pass upwardly through the hole 110 in the wall of the tank 30. Fuel vapour could then travel horizontally in FIG. 9 through the flange element 130 entering the flange element 130 at the aperture 132. This then provides another path for fuel vapour permeation through the flange element 130.

In order to further inhibit fuel vapour permeation through the flange element 130, a sealing bead 140 is laid down over the flange element 130. The sealing bead 140 is similar to the sealing bead 70 or the sealing bead 90 discussed above, that is, the sealing bead 140 may be formed from a multi layer material including a barrier layer such as sealing bead 70 or may be formed from a material having inherent barrier properties similar to sealing bead 90.

The flange element 130 represents an area of barrier discontinuity in respect of the tank 30. The sealing bead 140 overlays that area of barrier discontinuity and inhibits passage of hydrocarbon vapours through the area of barrier discontinuity represented by the flange element 130.

In FIG. 9, the area of barrier discontinuity is shown in the form of a separate flange element 130. Various other types of barrier discontinuity may also exist in the form of integral flanges or other like structures used to attach things to a tank 30. In each case, a fuel system component added to the tank may comprise at least a portion which does not include any form of barrier layer. In each case that portion then represents an area of barrier discontinuity. Fuel vapour permeation can be inhibited by overlying such component or the critical portion of such component to cover off the area of barrier discontinuity.

A bead 140 may be placed using a mechanism as shown in FIG. 8. In FIG. 8, the head 140 is shown as having a V-shaped slot 140 through which the material is extruded. A V-shaped slot is particularly suited to covering seams and the like as discussed in connection with FIGS. 4, 5, 6 and 7. However, other configurations for the slot 140 may be utilized depending upon the configuration and size of the area of barrier discontinuity which is to be covered by the sealing bead. As shown in FIG. 9, the sealing bead need not be V-shaped and may have any convenient shape as long as the edges of the bead are fused to the structures which have the necessary barrier qualities to eliminate the easy path for fuel vapour permeation represented by the area of discontinuity.

The invention has been discussed herein in association with preferred embodiments of the invention which are illustrative only. The full scope of the invention is set out in the following claims.

The invention claimed is:

1. A process for inhibiting fuel vapour permeation in a component for storing or conveying hydrocarbon fuels, wherein said component includes an area of barrier discontinuity comprising the steps of covering said area of barrier discontinuity of said component with a sealing bead wherein said sealing bead comprises a barrier element for inhibiting fuel vapour permeation therethrough.

2. The process of claim 1, wherein said sealing bead is comprised of material which is thermally fusible to a polyethylene fuel system component.

3. The process of claim 2, wherein said area of barrier discontinuity is a polymeric fitting.

4. A process for inhibiting fuel vapour permeation in a fuel system component intended for storing or conveying hydrocarbon fuel, wherein said component includes a wall structure and said wall structure has an area of barrier discontinuity comprising the steps of covering said area of barrier discontinuity of said wall structure externally with a sealing bead and fusing said sealing bead to the external surface of said wall structure and wherein said sealing bead comprises a barrier element for inhibiting fuel vapour permeation therethrough.

5. The process of claim 4 wherein said sealing bead is comprised of material which is thermally fusible to a polyethylene fuel system component.

6. The process of claim 5 wherein said area of barrier discontinuity is a polymeric fitting.

7. The process of claim 6 wherein said component is a fuel tank.

8. The process of claim 7 wherein said bead is a multilayer material comprising at least one layer for substantially inhibiting permeation of hydrocarbon vapours.

* * * * *